United States Patent [19]

Arai et al.

[11] Patent Number: 5,171,109
[45] Date of Patent: Dec. 15, 1992

[54] CUTTING TOOL

[75] Inventors: Tatsuo Arai; Takayoshi Saito, both of Ibaraki, Japan

[73] Assignee: Mitsubishi Materials Corporation, Tokyo, Japan

[21] Appl. No.: 832,702

[22] Filed: Feb. 7, 1992

[30] Foreign Application Priority Data

Feb. 15, 1991 [JP] Japan ................... 3-22331

[51] Int. Cl.$^5$ ................... B23B 27/16; B23C 5/22
[52] U.S. Cl. ................... 407/46; 76/115; 76/DIG. 2; 407/49; 407/101; 407/108
[58] Field of Search ................ 407/5, 41, 46, 49, 101, 407/108, 40, 33, 34, 47, 50, 102, 109–112; 76/115, DIG. 2

[56] References Cited

U.S. PATENT DOCUMENTS

| 2,595,090 | 4/1952 | Middleton | 407/101 X |
| 4,341,493 | 7/1982 | Erkfritz | 407/49 X |
| 4,396,315 | 8/1983 | Middleton | 407/41 |

FOREIGN PATENT DOCUMENTS 0234103  9/1989  Japan ................... 407/102

Primary Examiner—Steven C. Bishop
Attorney, Agent, or Firm—Cushman, Darby & Cushman

[57] ABSTRACT

A cutting tool is disclosed which has a tool body, a cutting insert and an insert-holding member. The tool body has a recess formed therein, and the cutting insert is received in the recess. The insert-holding member is attached to releasably secure the cutting insert to the recess. The insert-holding member includes a surface layer having a thickness of 0.1 to 1.0 mm and an interior portion. The surface layer is harder than the interior portion and has a hardness of from $H_RC$ 40 to 60.

6 Claims, 5 Drawing Sheets

CUTTING TOOL

BACKGROUND OF THE INVENTION

1. Field of the Invention

The present invention relates to cutting tools such as a milling cutter, an end mill and a lathe tool, and more particularly to those tools in which indexable cutting inserts are releasably secured to a tool body using an insert-holding member such as a support member, a seat member and a wedge member.

2. Prior Art

In the inserted cutters which are widely used for processing a metal workpiece, indexable cutter inserts formed of a hard material such as cemented carbide are releasably attached to the recesses formed in the tool body. For securing the cutter inserts to the recesses, various clamping methods are hitherto known. Typical methods involve causing a clamp screw to pass through the insert to be threaded into a recess; or pressing the insert against the recess by means of a wedge member or a clamp block. Furthermore, in recent years, in order to avoid the damage of the tool body caused by the fracturing of the insert, the insert is received in a support member of a hard material such as cemented carbide, and is secured to the tool body by being received in the support member. Moreover, even in the case where the insert is directly attached to the tool body using a clamp screw, a seating member formed of a hard material is often interposed between the insert and the recess of the tool body to prevent the recess from being damaged when the insert is fractured.

Thus, the support member and the seat member must have great hardness in order to ensure positive protection of the tool body and to enhance the wear resistance of the members themselves, and hence cemented carbide is hitherto used as a material for forming these members. However, inasmuch as the compression molding of cemented carbide involves many operational steps, the manufacturing cost is unduly increased. In addition, since the cemented carbide has high brittleness, the members formed of this material are susceptible to fracturing due to impacts encountered during the cutting operation. Moreover, setting aside the seating member which is formed into a simple plate, it has been difficult to prepare a support member of a desired shape. More specifically, the support member must usually be relatively intricate in shape, e.g., an aperture which is inclined with respect to the surface must be formed. However, since the cost for the compression molding of such an intricate support member is unduly high, the support member practically manufactured has been limited in shape.

Furthermore, a wedge member, which is used for pressing the insert against the recess, has been hitherto formed by precision casting using a material less hard than the cemented carbide, and hence no difficulty arises in forming wedge members of an intricate shape. However, since the precision of the casting is not high enough, various after-working operations such as sanding are required after the casting operation, so that the manufacturing cost is unduly high.

SUMMARY OF THE INVENTION

It is therefore an object and feature of the present invention to provide a cutting tool which includes an insert-holding member provided with sufficiently great hardness and toughness, and which can be manufactured at reduced cost.

According to the present invention, there is provided a cutting tool comprising a tool body having a recess formed therein; a cutting insert received in the recess; and an insert-holding member for releasably securing the cutting insert in the recess, the insert-holding member including a surface layer having a thickness of 0.1 to 1.0 mm and an interior portion, the surface layer being harder than the interior portion and having a Rockwell hardness of from $H_RC$ 40 to 60.

In the foregoing, the term "insert-holding member" is defined so as to refer to any kinds of members for use in securing the cutting inserts to the tool body, and may involve support members, seat members, wedge members, clamp members and the like.

With the above construction, since the surface layer of the insert-holding member has a hardness $H_RC$ of from 40 to 60, the wear resistance of the insert-holding member is not deteriorated. Furthermore, inasmuch as the interior portion of the insert-holding member is less hard than the hard layer surface, a sufficiently high toughness can be ensured. As a result, fracturing of the insert-holding member can be prevented. In addition, the vibration of the tool occurring during the cutting operation is absorbed in and damped by the interior portion of the insert-holding member, so that the development of chattering of the cutting tool can be prevented.

Moreover, it is preferable that the insert-holding member be formed by injection-molding a hard material and subjecting the molded article to carburizing hardening. With this treatment, the manufacturing cost of the insert-holding member can be substantially reduced. This is because after-working operations are not required since the precision in the injection molding operation is sufficiently high.

DESCRIPTION OF THE PREFERRED EMBODIMENTS OF THE INVENTION

Figure 1:
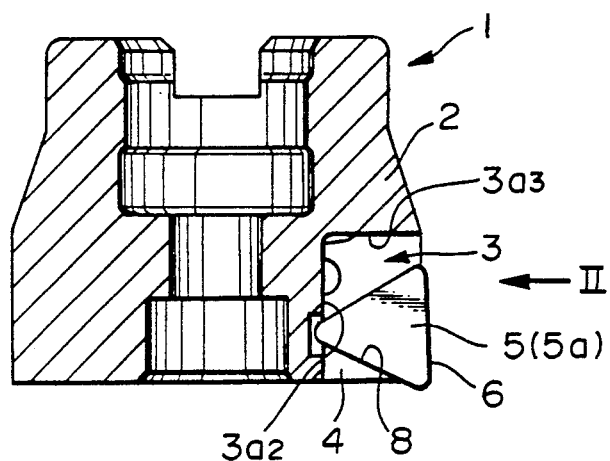
FIG. 1 is a cross-sectional view of a face milling cutter in accordance with an embodiment of the present invention.
Figure 2:
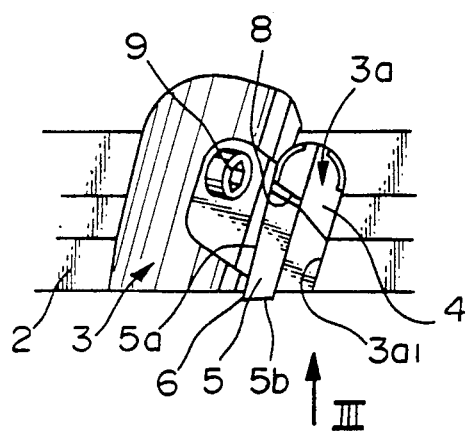
FIG. 2 is a side elevational view of a part of the milling cutter of FIG. 1 as seen in the direction indicated by the arrow II in FIG. 1.
Figure 3:
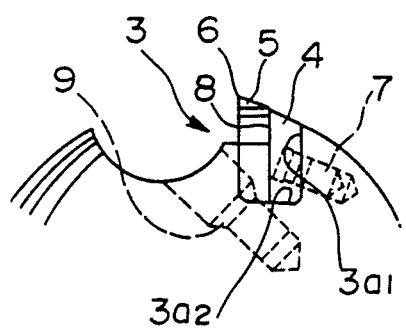
FIG. 3 is an end view of a part of the milling cutter of FIG. 1 as seen in the direction indicated by the arrow III in FIG. 2.

FIGS. 1 to 6 depict a face milling cutter in accordance with an embodiment of the present invention, which comprises a tool body 2 of a circular cross-section having an axis of rotation therethrough and having a plurality of recesses 3 formed therein so as to open radially outwardly and axially forwardly of the body, a plurality of support members (insert-holding members) 4 each releasably received in and secured to a respective recess 3, and a plurality of indexable cutter inserts 5 each releasably attached to a respective support member 4.

Each of the cutter inserts 5 is manufactured by forming cemented carbide into a generally triangular plate, and is provided with cutting edges 6 on the periphery of the front face, which serves as a rake surface 5. The side face of the insert 5 is formed so as to be inclined inwardly in a direction away from the front face, and serves as a relief surface 5b. Thus, the cutting insert 5 in the illustrated embodiment is so-called "positive". Furthermore, a support member-receiving recess portion 3a is formed in each of the recesses 3 of the tool body 2, and each of the support members 4 is fit in the recess portion 3a of a respective recess 3 and releasably attached thereto by means of a support member screw 7 passing through a through aperture 4a of the support member 4 and threaded into the recess portion 3a of the tool body 2.

Figure 4:
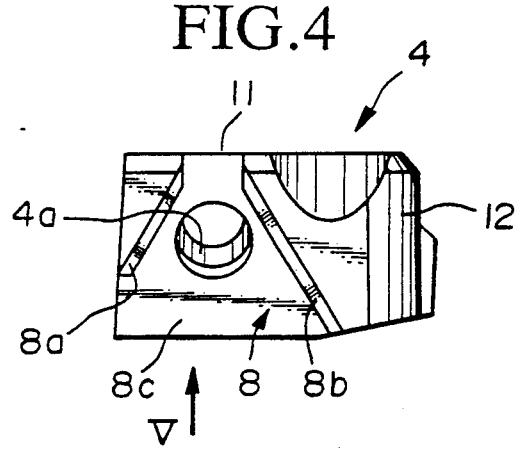
FIG. 4 is a plan view of a support member attached to the milling cutter of FIG. 1.
Figure 5:
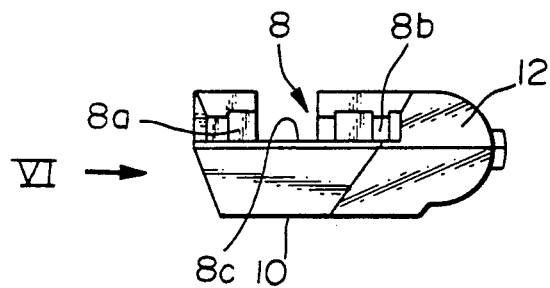
FIG. 5 is a side-elevational view of the support member of FIG. 4 as seen in the direction indicated by the arrow V in FIG. 4.
Figure 6:
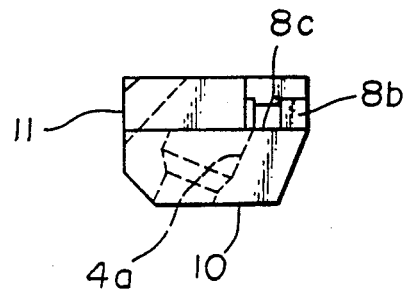
FIG. 6 is a side-elevational view of the support member of FIG. 4 as seen in the direction indicated by the arrow VI in FIG. 5.
Figure 7:
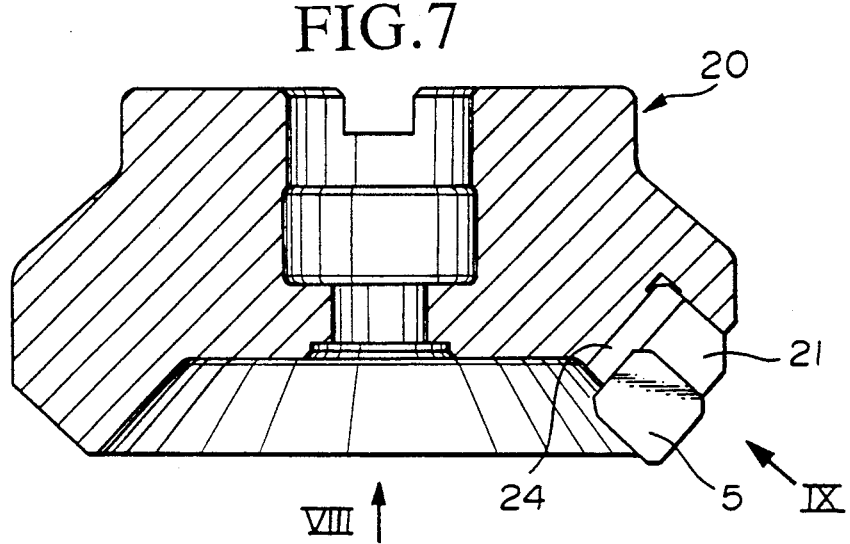
FIG. 7 is a cross-sectional view of a cutting tool in accordance with another embodiment of the present invention.
Figure 8:
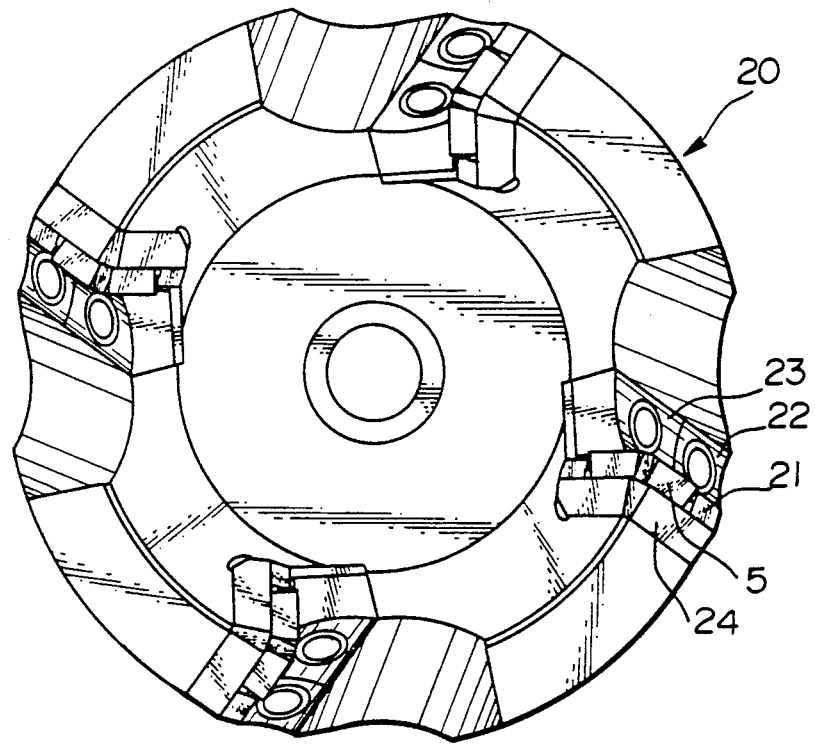
FIG. 8 is an end view of the cutting tool of FIG. 7 as seen in the direction indicated by the arrow VIII in FIG. 7.
Figure 9:
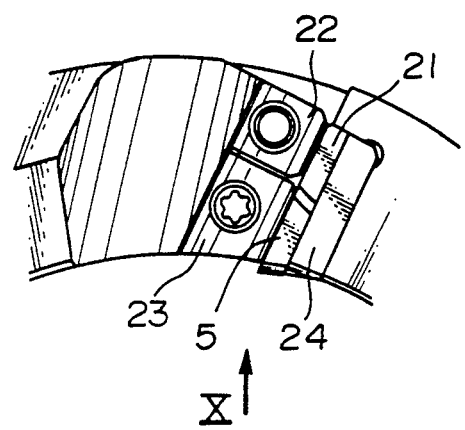
FIG. 9 is a view of a part of the cutting tool of FIG. 7 as seen in the direction indicated by the arrow of IX in FIG. 7.
Figure 10:
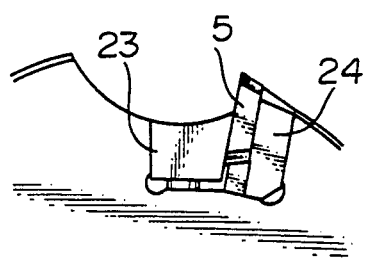
FIG. 10 is a view of the cutting tool of FIG. 7 as seen in the direction indicated by the arrow of X in FIG. 7.

As best shown in FIGS. 4 to 6, the support member 4, which is of a rectangular shape as viewed in plan, is provided with an insert receiving seat 8 on which the cutting insert 5 is fitted, and the aforesaid through aperture 4a through which the support screw 7 is inserted is formed therein. The support member 4 further includes bearing walls 8a and 8b with which the relief surfaces 5b of the cutting insert 5 are mated, an insert-receiving face 8c on which the insert 5 is positioned, a seating face 10 to be received on the bottom $3a_1$ of the support member-mounting portion 3a, and side faces 11 and 12 which are held in contact with the walls $3a_2$ and $3a_3$ of the support member-mounting portion 3a.

Moreover, a hard layer is formed in an entire surface portion of the support member 4 such that the surface portion is harder than the interior portion. The hardness of the hard layer is set so as to range from $H_RC$ (Rockwell hardness) 40 to 60, and the thickness of the layer is set to the range between 0.1 mm to 1.0 mm. In the foregoing, if the hardness is less than 40, the wear resistance of the support member 4 is insufficient. On the other hand, if the hardness exceeds 60, the surface portion becomes unduly brittle, and is susceptible to fracturing. Therefore, the hardness of the hard layer is set as described above. Furthermore, if the layer thickness is less than 0.1 mm, the interior portion, which is less hard than the surface portion, may be easily exposed during the grinding operation after the hardening operation. On the other hand, if the layer thickness exceeds 1.0 mm, the density of carbon in the surface portion of the support member 4 becomes great, so that the support member, on the contrary, becomes brittle.

Various methods may be applicable for the shaping of the support member 4 and the formation of the hard layer. In the illustrated embodiment, an injection molding method using a generally known steel such as chromium-molybdenum steel as a material is employed. More specifically, a binder composed of plastic powder is first added to a powder of chromium-molybdenum steel, and the resulting mixture is injected into a mold (not shown), which has a cavity of a shape somewhat larger than the shape of the supporting member 4, to produce an injection molded article. Thereafter, the molded article is subjected to sintering to remove the binder to produce a prescribed sintered product. In the foregoing, the reason why the cavity is formed somewhat larger than the support member 4 is that the injection molded article shrinks during the sintering operation. Usually, shrinkage of about 15 to 30 percent is anticipated in the manufacture. After the sintering operation is completed, the sintered product is subjected to a carburizing hardening treatment, and the after-working operations such as polishing of the surfaces are carried out to produce a prescribed finished product. In the foregoing, the insert receiving seat 8 and the through aperture 4a are formed during the injection molding operation, so that there is no need to form these portions after the molding operation.

Furthermore, when the support member 4 is manufactured according to the above procedures, the portions of the support member 4 to be finished after the molding operation include the seating face 10 and the side face 11, and further the side wall 12, to which the curved portion as seen in FIG. 5 corresponds. These portions are formed in desired shapes and dimensions by conducting the grinding operation after the carburizing hardening operation. In contrast, with respect to the other walls and face 8a to 8c in the insert-receiving recess 8, only a simple polishing operation is carried out in order to remove debris which has adhered during the carburizing treatment. In these procedures, if the flatnesses of the walls and face 8a to 8c of the insert-receiving recess 8 are deteriorated by the sintering operation, pressing for sizing may be carried out after the sintering operation to improve the flatnesses. Naturally, no after-working such as reaming is carried out for the through aperture 4a.

As described above, in the illustrated embodiment, the hard layer having a hardness $H_RC$ of from 40 to 60 is formed only in the surface portion of the support member 4 by the carburizing hardening treatment. Therefore, the interior portion has a toughness of the same degree as that of a steel material which is not subjected to hardening treatment. As a result, the support member 4 comes to possess a high wear resistance thanks to the presence of the hard layer, and hence the protection of the tool body, i.e., the original aim for the provision of the support member 4, can be attained. In addition, inasmuch as the support member 4 comes to have a sufficient toughness thanks to the presence of the soft interior portion, the support member 4 becomes less susceptible to fracturing even when it undergoes great impact during the cutting operation. Furthermore, the vibration of the cutting tool caused during the cutting operation is damped by the interior portion of the support member 4, so that the development of chattering of the cutting tool during the cutting operation can be positively prevented.

Moreover, in the present embodiment, almost all of the portions of the support member 4 is formed by injection molding, and only the grinding of the reference faces such as the seating face 10 in the support member 4 are carried out after the carburizing hardening treatment. Therefore, as compared with the case where some working operations are required after the molding of cemented carbide, or with the case where a steel material is directly processed into the support member, the manufacturing cost can be substantially reduced. In particular, since in the present embodiment, the through aperture 4a must be formed so as to extend in an oblique manner with respect to the surface (seating face 8c), the manufacturing cost can be markedly reduced.

In the above embodiment, the manufacture of the support member 4 by injection molding method is explained. However, in a face milling cutter with indexable inserts 20 as shown in FIGS. 7 to 10, wedge members 22 and 23 for pressing the insert 5 against the recess, a plate-like seat member 24 to be disposed beneath the insert 5 may be formed by the injection molding method which is accompanied by the carburizing hardening treatment. More specifically, when the wedge member 22, 23 and the seat member 24 are thus formed, the wear resistance of each member is enhanced by the resulting hard layer, while vibrations are absorbed by each interior portion, which is less hard than the hard layer. Furthermore, when the wedge members 22 and 23 are formed by the injection molding method, the need of working operations after the molding operation can be substantially decreased as compared with the case of precision casting, so that the manufacturing cost can be further reduced.

Figure 11:
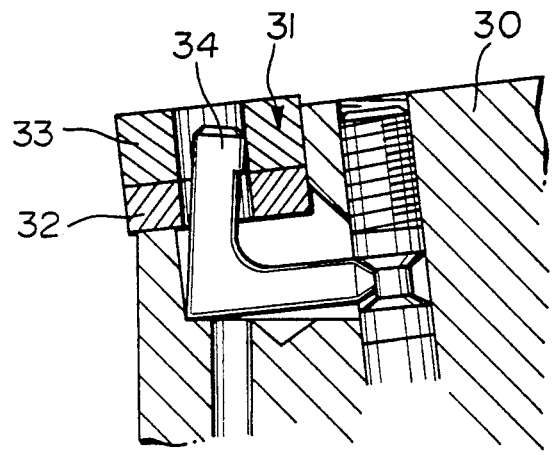
FIG. 11 is a cross-sectional view of a lathe tool in accordance with yet another embodiment of the present invention.
Figure 12:
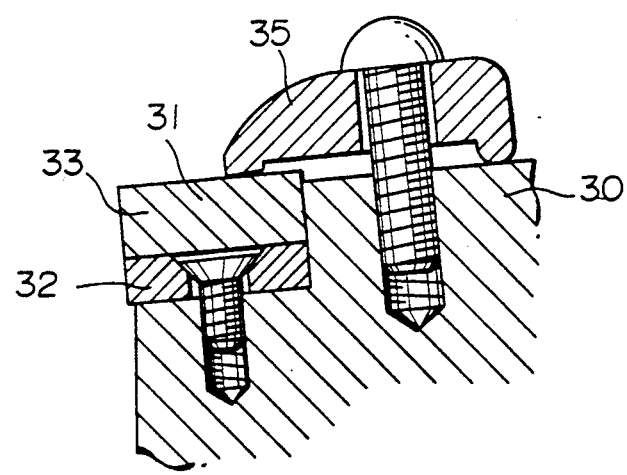
FIG. 12 is a cross-sectional view of another lathe tool in accordance with a further embodiment of the present invention.

FIGS. 11 and 12 depict cutting tools in accordance with further embodiments of the invention, in which a cutting insert 33 is received in a recess 31 of a tool body 30 with a seat member 32 being interposed therebetween, and is releasably attached thereto by bringing a clamp lever 34 or a clamp block 35 into engagement with the insert 33. In the tools of these kinds, the seat member 32 should be provided with a hard layer by subjecting the injection molded article to carburizing hardening treatment. With the provision of the hard layer, the enhancement of the wear resistance of the seat member 32 as well as the absorption of vibration can be attained, and the manufacturing cost can be reduced.

Obviously many modifications and variations of the present invention are possible in light of the above. It is therefore to be understood that within the scope of the appended claims, the invention may be practiced otherwise than as specifically described.

What is claimed is:

1. A cutting tool comprising:
a tool body having a recess formed therein;
a cutting insert received in said recess; and
an insert-holding member for releasably securing said cutting insert in said recess, said insert-holding member including a surface layer having a thickness of 0.1 to 1.0 mm and an interior portion, said surface layer being harder than said interior portion and having a hardness of from $H_RC$ 40 to 60.

2. A cutting tool as recited in claim 1, wherein said insert-holding member is an injection molded article which includes a carburized surface portion defining said surface layer.

3. A cutting tool as recited in claim 1, wherein said insert-holding member is a support member for receiving said cutting insert.

4. A cutting tool as recited in claim 1, wherein said insert-holding member is a seat member disposed under said cutting insert.

5. A cutting tool as recited in claim 1, wherein said insert holding member is a wedge member disposed between said cutting insert and said tool body.

6. A cutting tool as recited in claim 3, wherein said support member includes an insert receiving recess having an insert receiving face, and includes a through aperture formed through said insert receiving recess so as to be inclined with respect to said insert receiving face.

* * * * *